United States Patent [19]

O'Loughlin et al.

[11] Patent Number: 5,179,385
[45] Date of Patent: Jan. 12, 1993

[54] VISUAL NAVIGATION AID WITH POINT OF INTEREST FEATURE

[75] Inventors: Thomas M. O'Loughlin, Milford; Douglas W. Low, Essex; Neil Titcomb, Branford, all of Conn.

[73] Assignee: International Marine Industries, Inc., Guilford, Conn.

[21] Appl. No.: 816,756

[22] Filed: Jan. 2, 1992

[51] Int. Cl.⁵ .................................................. G01S 7/22
[52] U.S. Cl. ............................... 342/176; 342/183; 342/184
[58] Field of Search ............... 342/176, 177, 182, 183, 342/184

[56] References Cited

U.S. PATENT DOCUMENTS 4,081,802  3/1978  Elmore et al. ............... 342/184 X

OTHER PUBLICATIONS

Navionics spa-Geonav HTC, 4 pages.
Boat Electronics '91, "VIDEO CHARTS-Watch your voyage spring to life on an electronic display", pp. 54,56,95.
Navstar Electronics, Inc., NAVSTAR 2000 P-Chart Plotters (4 pages).
Boat Electronics '91, "Radars" pp. 26,28,30,84,85.
Robertson RobChart 100 (Robertson-Shipmate, Inc., Hauppauge, NY 1178 (4 pages).

*Primary Examiner*—T. H. Tubbesing
*Attorney, Agent, or Firm*—St. Onge Steward Johnston & Reens

[57] ABSTRACT

A navigation aid is provided comprising a radar antenna, a position sensor, a compass, map/chart data, a display, and a controller. The controller determines whether the display depicts a chart, a radar sweep or both. Preferably, the visual navigation aid includes a point of interest feature, wherein at least one point of interest is visually selected on the chart or radar sweep by a cursor or the like. The controller also computes the location of the selected point of interest for display on the chart or radar sweep. In another aspect, the invention comprises methods for inputting and displaying a point of interest on a chart or radar sweep.

22 Claims, 9 Drawing Sheets

5,179,385

1

VISUAL NAVIGATION AID WITH POINT OF INTEREST FEATURE

FIELD OF THE INVENTION

The invention relates to visual navigation aids and, more specifically, to a combination radar and chart plotter which enables correlation of radar targets with chart features.

BACKGROUND OF THE INVENTION

State-of-the-art visual navigation aids include waypoint radar (FIGS. 7 and 8) and waypoint chart plotters (FIGS. 9 and 10). Waypoint radar systems generally comprise a radar combined with a compass, a position sensor, and a waypoint input. The location of the waypoint must be input in latitude and longitude (lat/long), or a derivative. Using this lat/long location, current position, and heading, waypoint radar systems calculate the range and relative bearing to the waypoint and display the waypoint on the radar sweep. The necessity of manually, numerically entering the waypoint location makes waypoint radar systems somewhat difficult and cumbersome to use, and introduces the possibility of user error in determining inputting the waypoint lat/long. Thus, for example, a user of waypoint radar may know where to steer to approach the waypoint but may not know whether the waypoint is his intended destination. Another disadvantage of this, and indeed of any radar based system, is the difficulty of discerning a target from clutter, and indeed from other targets.

Waypoint chart plotters generally comprise a chart plotter combined with a position sensor and a waypoint input. The waypoint can be selected from the chart display with a cursor or the like, and its location can be automatically read from the chart. The chart plotter calculates range and bearing to the waypoint from current position data and the waypoint location, and displays the waypoint at its location on the chart. Although a waypoint chart plotter helps a user visualize his position and course to the waypoint, it will not help him avoid a collision along his path to the waypoint.

SUMMARY OF THE INVENTION

Accordingly, it is an object of the invention to provide a navigational aid which comprises a radar and chart plotter, enabling correlation of radar targets and chart features.

Another object of this invention is to provide a navigation aid of the above character which is relatively simple and dependable in use.

A further object of the invention is to provide a navigation aid of the above character including a chart data input and a compass input.

Yet another object of the invention is to provide a navigation aid of the above character including a visual selector for inputting a point of interest.

A still further object of the invention is to provide a navigation aid of the above character including a display capable of depicting a radar sweep and a chart.

Other objects of the invention will be obvious and may in part appear hereinafter.

These and other objects are achieved by provision of a visual navigation aid comprising a radar antenna, a position sensor, a compass, map/chart data, a point of interest input, a display, and a controller. The controller receives data from the antenna, position sensor, compass and charts, and determines the location of the point of interest for display. The controller also determines whether the display depicts the point of interest on a chart, a radar sweep or both simultaneously. The display is preferably capable of displaying both the chart and the radar sweep; and, most preferably, the controller comprises a toggle switch for alternately displaying the chart and the radar sweep.

Preferably, the point of interest is visually selected on the chart or radar sweep display by a cursor or the like. The location, and current range and bearing to the point of interest are determined so that the point of interest may be graphically represented in its location on both the chart and the radar sweep for correlation with radar targets and chart features.

In another aspect, the invention comprises methods for displaying the point of interest on the chart and the radar sweep. For display on the chart, the method includes visually selecting the point of interest on a radar sweep, computing a location of the point of interest, and displaying the point of interest on the chart at the point of interest location. For display on the radar sweep, the method includes selecting the point of interest, determining its location, computing range and bearing to the point of interest location, and displaying the point of interest on the radar sweep at the point of interest location.

BRIEF DESCRIPTION OF THE DRAWINGS

The invention and its particular features will become more apparent from the following detailed description considered with reference to these accompanying drawings.

DETAILED DESCRIPTION OF THE INVENTION

Figure 1:
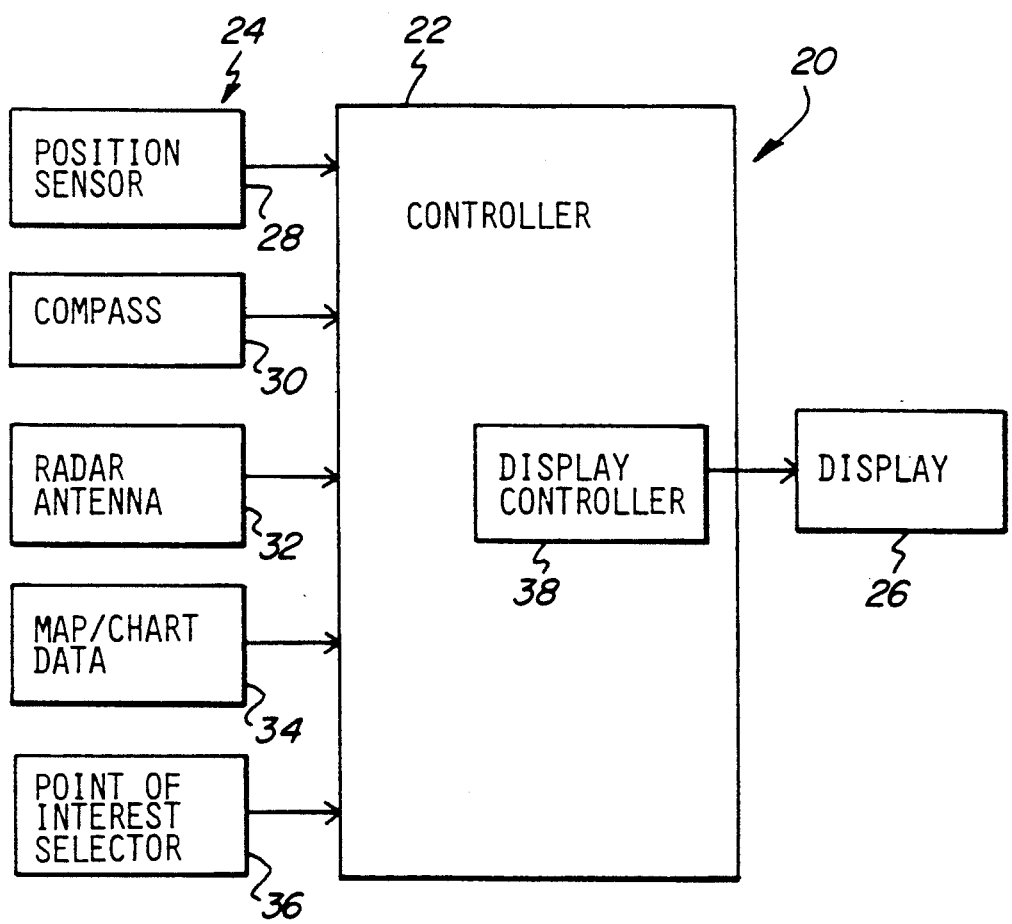
FIG. 1 is a block diagram depicting components of the visual navigation aid of the invention.

FIG. 1 is a block diagram generally depicting components of a visual navigation aid 20 in accordance with the invention. Visual navigation aid 20 comprises a controller 22, a plurality of inputs 24 and a display 26. Although controller 22 is schematically illustrated as a single component, it is understood that the functions performed by controller 22 may be performed by several different components or subcontrollers such as charting logic, radar logic or position sensing logic; or indeed by one or more of inputs 24. Inputs 24 include a position sensor 28, a compass 30, a radar antenna 32, map/chart data 34, and a point of interest (POI) selector 36.

Position sensor 28 may comprise a LORAN, GPS, SATNAV, DECCA, or other compatible position sensing device which provides latitude and longitude, or derivative data, concerning a current position 40 (see FIG. 2) of radar antenna 32. The radar antenna position may correspond to the approximate position of a user's vehicle (automobile, boat, airplane or the like), or indeed the user herself.

Compass 30 provides, to controller 22, data concerning the direction in which radar antenna 32 is aligned. Similarly, the direction in which radar antenna 32 is aligned may correspond to the direction in which a user is facing, or the direction in which a user's vehicle (plane, boat, ship or the like) is heading. This directional data is used by controller 22 to distinguish "compass bearing" from "relative bearing" as discussed more completely below in conjunction with FIGS. 3 to 6. Briefly, "compass bearing" is what a compass reads in a direction toward the point of interest; whereas, "relative bearing" is the number of degrees through which the radar antenna or user must turn to face in a direction toward the point of interest.

Radar antenna 32 provides controller 22 with radar data 42 (see FIG. 2) concerning targets within specified range and bearing limits in the conventional manner.

Map/chart data 34 may be provided on any of a number of relatively permanent storage media such as discs, cards, tapes, CDs and the like which are compatible with and supported by controller 22. Preferably, the chart data is provided on computer cartography cards (not shown in any Figure). Currently, the resolution of the charts used in the invention is about 260,000 pixels per one-half square mile, so that the location of map features such as landmarks, navigation buoys, and the like will be relatively accurately represented. Preferably, the chart data is provided on a modular type storage media so that higher resolution charts and/or chart data from different locations can easily be substituted into visual navigation aid 20 as they become available or necessary.

Point of interest selector 36 comprises means for inputting, to controller 22, at least one point of interest. The point of interest may represent a target on the radar sweep, a feature on the chart, a destination, or the like and may comprise a particular geographic location, general area, or bounded region. The point of interest is preferably visually selected on display 26 by means of a cursor, mouse, light pen, stylus or the like.

Display 26 is capable of depicting both a radar sweep 46 (see FIGS. 2 and 5A–5C) received from antenna 32, and a map or chart 48 (see FIGS. 2 and 6A–6C) from map/chart data 34. Display controller 38 functions to determine whether display 26 is depicting a radar sweep or a chart or both at any given moment. Preferably display controller 38 comprises a toggle switch for alternating the image depicted on display 26 between a radar sweep and a chart. It is understood, however, that display controller 38 may comprise means for splitting the screen of display 26, providing the radar sweep and chart in respective windows, overlaying the chart and radar sweep, or otherwise determining whether and how the radar sweep or the chart are depicted at any given moment.

The capability of depicting either a radar sweep or a corresponding chart or both on a single display 26 enables correlation of radar targets, chart features and points of interest, enhancing the ability to discern current position and safest course to destination. Prior art navigational aids typically either are collision avoidance devices such as radars which aid in avoiding a collision on the way to destination, or are chart plotters which permit visualization of position and course to destination but are not collision avoidance tools. See *Boat Electronics '91*, pp. 28 and 54. Neither of these devices permits correlation of even radar targets and chart features.

In order to accurately depict charts, display 26 is preferably provided as a raster scan type display and thus radar data 42 received by controller 22 from radar antenna 32 must be converted to rectangular coordinates (e.g. pixels) prior to display. This polar to rectangular coordinate conversion for purposes of display is known in the radar art and forms no part of the invention.

Typically, radar sweeps are displayed in "head-up" orientation, i.e. with the current heading of the radar antenna facing upwardly or toward the top of the display. Typically also, maps and charts are designed in "north-up" orientation, i.e. with North aligned upwardly or toward the top of the page. Controller 22 preferably is capable of displaying radar sweep 46 in either conventional head-up, or north-up orientations. Controller 22 may also be programmed to display charts 48 in either conventional north-up or head-up orientations. Most preferably, controller 22 may be-programmed to automatically substantially match chart and radar sweep display orientation. Advantageously, both the chart and corresponding radar sweep are displayed with the same orientation in order to maximize ease of correlation of radar targets and chart features.

Similarly, chart data 34 is preferably provided in a variety of scales and radar data 42 may be taken for a variety of ranges. Radar range and chart scale are advantageously substantially matched, again to maximize ease of correlation of radar targets and chart features. Preferably, controller 22 may be programmed to automatically substantially match chart scale and radar range.

Figure 2:
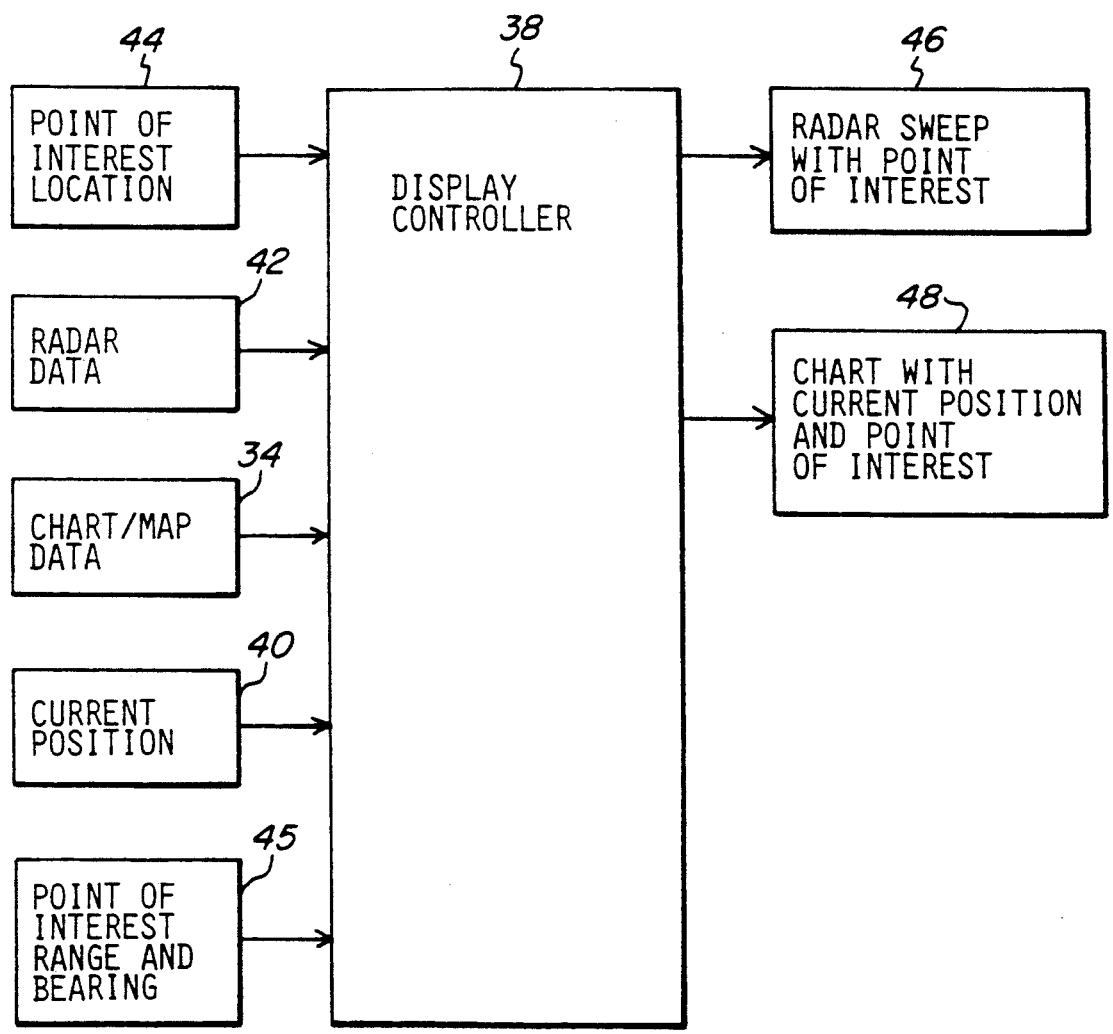
FIG. 2 is a block diagram depicting input and output to the display controller of the visual navigation aid of FIG. 1.
Figure 3:
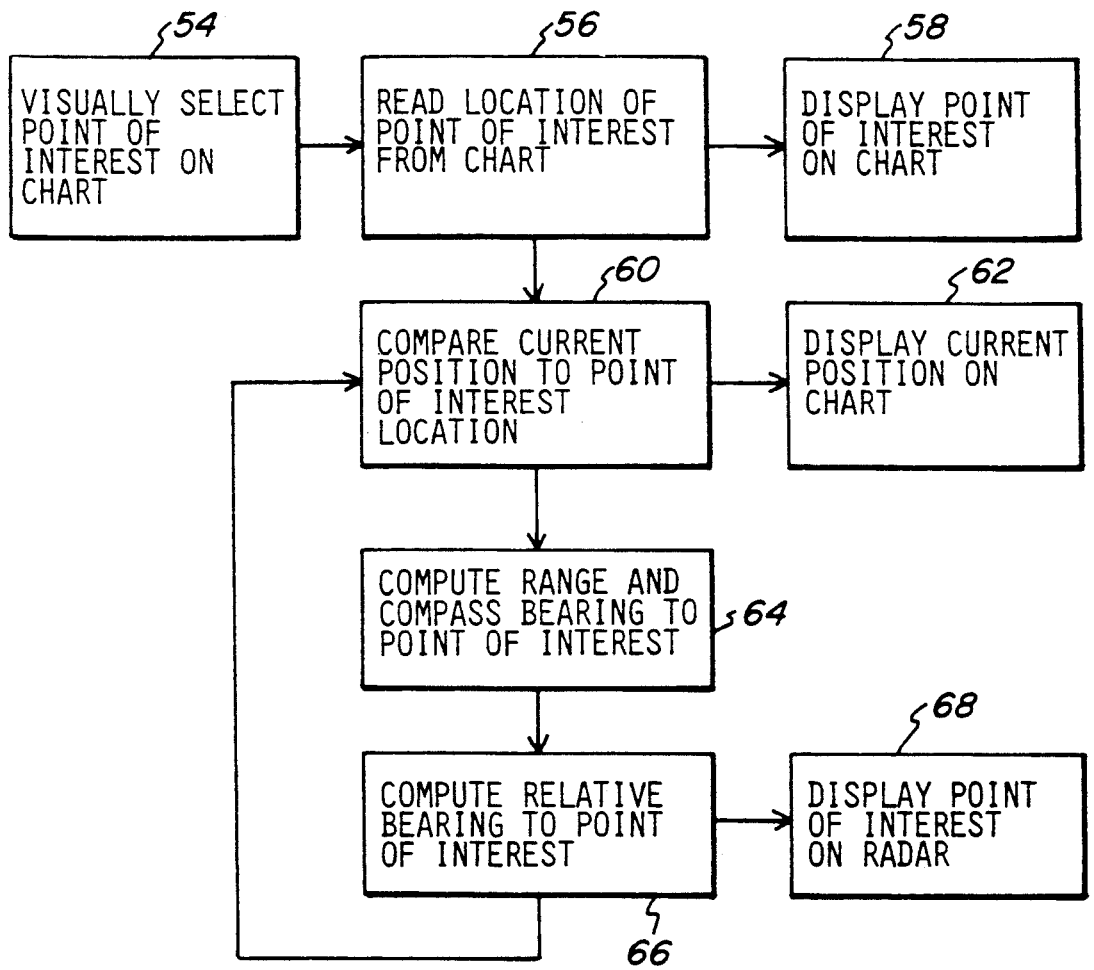
FIG. 3 is a flow diagram depicting operation of the controller of the visual navigation aid of FIG. 1 for selection of a point of interest on a chart.
Figure 4:
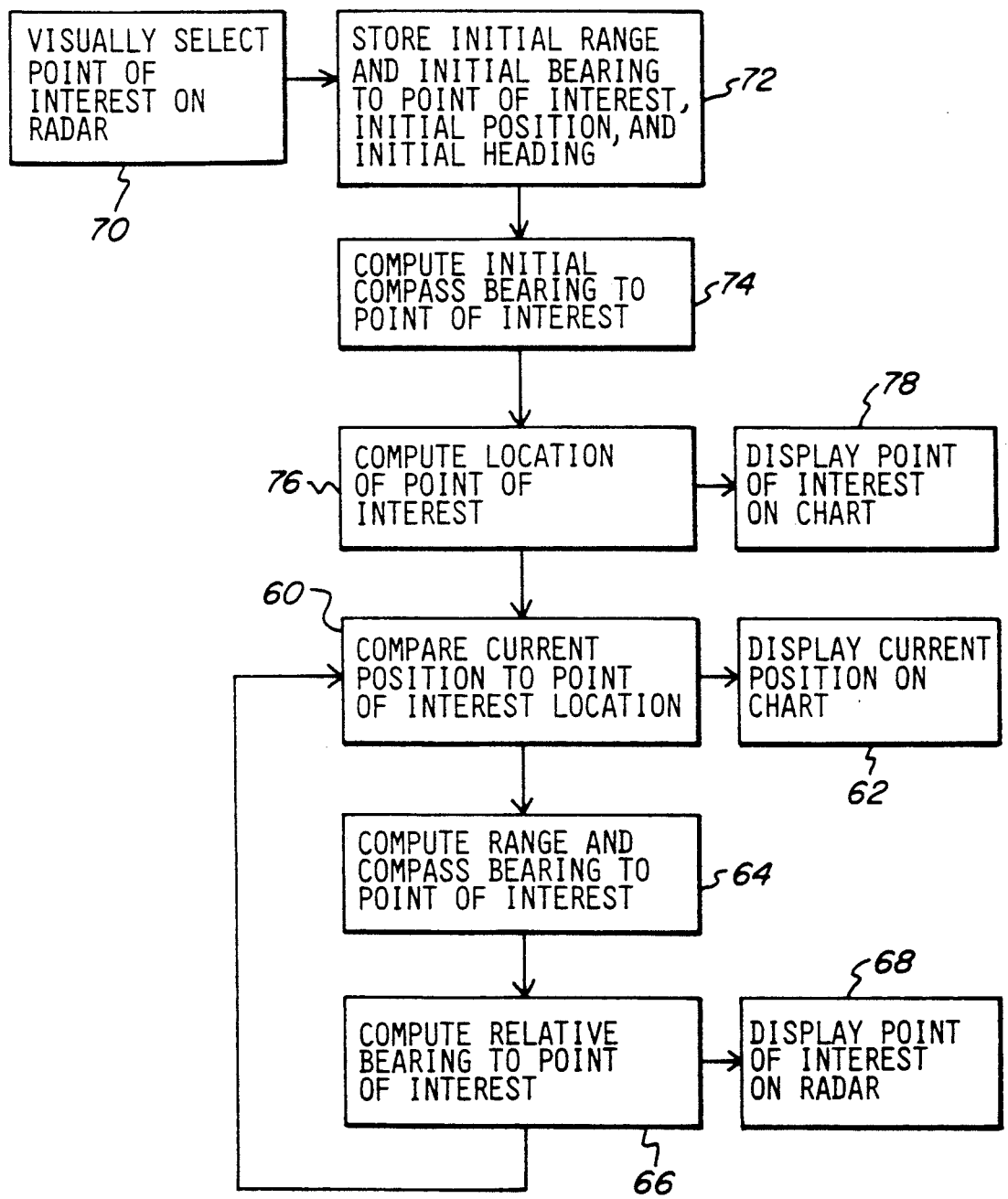
FIG. 4 is a flow diagram depicting operation of the controller of the visual navigation aid of FIG. 1 for selection of a point of interest on a radar sweep.

Referring now to FIGS. 3 and 4, flow diagrams generally depict operation of visual navigation aid 20 from selection through display of a point of interest. FIG. 3 depicts operation for visual selection of a point of interest on chart display 48. FIG. 4 depicts operation for visual selection of a point of interest on radar sweep 46. Turning first to FIG. 3, operation of visual navigation aid 20 is diagrammatically illustrated for visual selection at 54 of a point of interest on chart display 48. At 56, the location 44 (in latitude and longitude) of the selected point of interest (see FIG. 2) is determined. Preferably, chart data 34 is scaled in latitude and longitude and the point of interest location 44 can be read directly from chart display 48. Since the point of interest is selected on chart display 48 in its latitude and longitude location, a point of interest indicator 50 (see FIG. 6A) is displayed at 58 on the chart at the selection location.

Turning now to FIG. 4, operation of visual navigation aid 20 is diagrammatically illustrated for visual selection at 70 of a point of interest on radar sweep 46. Although point of interest indicator 50 may at this time be depicted on radar sweep 46 in the selection location, it is preferred that the point of interest indicator only be displayed after computing its location because it is assumed that radar antenna 32 is generally moving. At 72, the initial range and bearing from radar antenna 32 to the selected point of interest, and the initial position and heading of radar antenna 32 are stored in controller 22.

If radar sweep 46 is displayed in head-up orientation, then initial bearing will be initial relative bearing and controller 22 will utilize the initial heading to compute, at 74, initial compass bearing from radar antenna 32 to the point of interest. If, however, radar sweep 46 is displayed in north-up orientation, then initial bearing will be initial compass bearing and step 74 may be omitted. At 76, controller 22 uses initial position of the antenna to compute location 44 (in latitude and longitude) of the selected point of interest (see FIG. 2); and at 78, point of interest indicator 50 is displayed on the chart at the computed location.

After determination of the point of interest location 44 (see FIG. 2), operation of the diagrams in FIGS. 3 and 4 is substantially the same. So, referring to both FIGS. 3 and 4, next the point of interest location is compared to the current position 40 of radar antenna 32 at 60. A current position indicator 41 (see FIGS. 6A-6C) is displayed at 62 on the chart of current position 40 of radar antenna 32. After the comparison, controller 22 computes range and compass bearing from radar antenna 32 to point of interest location 44 at 64. If radar sweep 46 is displayed in head-up orientation, then using current heading data from compass 30, controller 22 computes relative bearing from radar antenna 32 to point of interest location 44 at 66. If radar sweep 46 is displayed in north-up orientation, then step 66 may be omitted. Next, as illustrated at 68, point of interest indicator 50 may then be displayed on radar sweep 46 (see FIG. 5B).

It is currently preferred to depict point of interest indicator 50 alternately at point of interest location 44 on chart 48 or at point of interest range and bearing 45 (see FIG. 2) on radar sweep 46 on a single display 26. It is understood, however, that point of interest indicator 50 may be depicted simultaneously at point of interest location 44 on chart 48 and at point of interest range and bearing 45 on radar sweep 46 if, for example, more than one display 26 is used, or display controller 48 comprises means for splitting display 26 using windows or otherwise. Moreover, it is understood that point of interest range and bearing 45 may comprise either compass bearing or relative bearing depending upon the display orientation, head-up or north-up, used for radar sweep 46.

Since the current position 40 of radar antenna 32 is likely to change over time, comparing step 60 and computing step (64 or 66) are repeated at a timed or refresh interval. A refresh interval of about two seconds has been found to be adequate for most types of coastal navigation, however, the interval may need to be varied depending upon factors such as radar antenna speed, chart resolution, radar range, and the like. For example, the higher the antenna speed or chart resolution, the shorter the refresh interval which is needed to insure accurate displays.

Figure 5C:
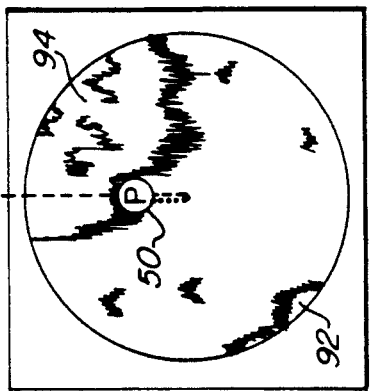
FIGS. 5C and 6C schematically depict respectively the radar sweep and the chart of the visual navigation aid of FIG. 1 as the point of interest is approached.
Figure 5B:
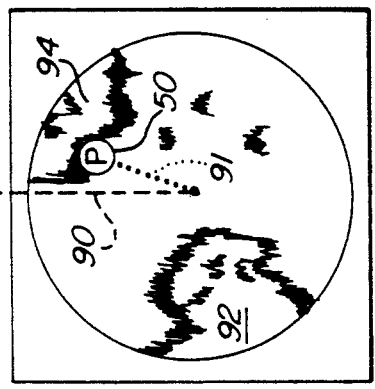
FIGS. 5B and 6B schematically depict respectively the radar sweep and the chart of the visual navigation aid of FIG. 1 after computation of the range and bearing to the selected point of interest.
Figure 5A:
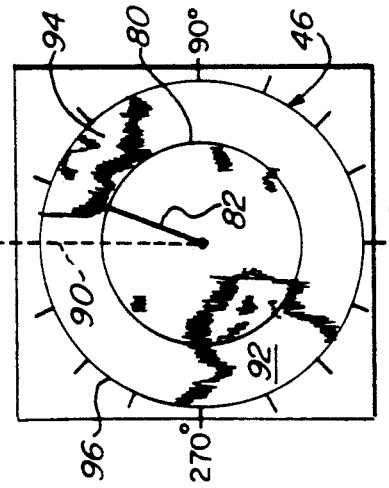
FIG. 5A and 6A schematically depict selection of a point of interest respectively on a radar sweep and on a chart of the visual navigation aid of FIG. 1.
Figure 6C:
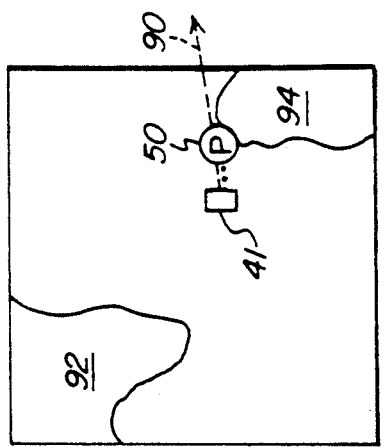
Figure 6B:
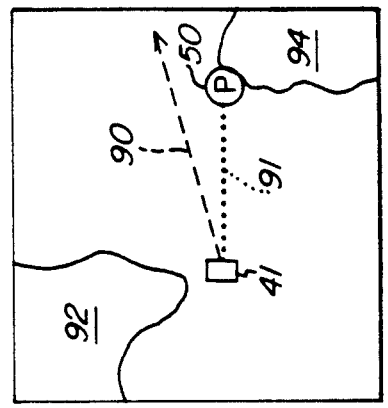
Figure 6A:
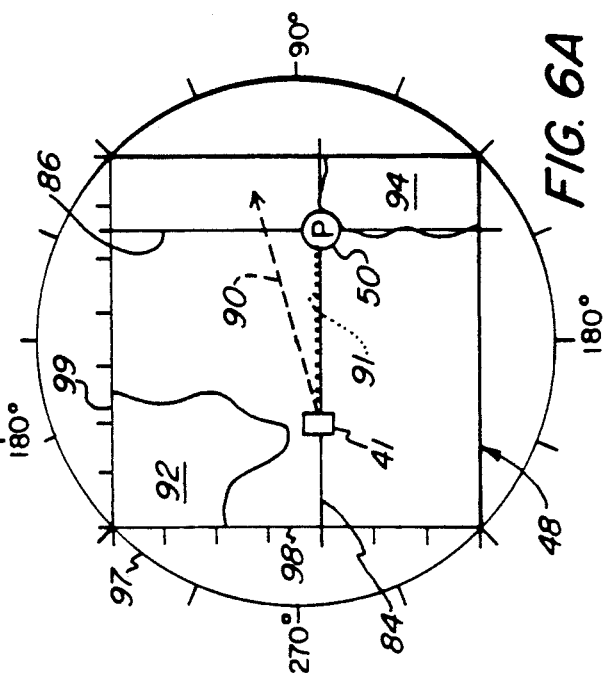

Turning briefly to FIG. 5A, the point of interest is selected on radar sweep 46 most preferably using a range line 80 and a bearing line 82; whereas, turning briefly to FIG. 6A, the point of interest is selected on chart 48 most preferably using a latitude line 84 and a longitude line 86. Where the point of interest is selected on chart 48, the location of the point of interest in latitude and longitude can be read, or directly input, from the chart. However, where the point of interest is selected on radar sweep 46, the range and relative bearing from radar antenna 32 to the point of interest can be readily determined.

FIG. 2 is a flow diagram depicting input and output to display controller 38. Once a point of interest has been selected at 36 (FIG. 1), and the location 44 or range and bearing 45 of the position of interest has been determined by controller 22, display controller 38 may display point of interest indicator 50 on either radar sweep 46 or chart 48 in its proper position. In the case of radar sweep display 46, current position 40 of the radar antenna remains at the center of the radar sweep, as is conventional. Thus, as the radar antenna, user, or user's vehicle moves, the proper location of the point of interest 44 must be updated for display on radar sweep 46. The opposite is true in the case of chart display 48, wherein the location of the point of interest 44 is constant, and the current position 40 of the radar antenna or user's vehicle moves. Thus, on chart display 48, controller 22 updates the current position 40 of the radar antenna or user's vehicle for display on chart 48.

Referring now to FIGS. 5A-5C and 6A-6C, some of these concepts are illustrated by example. FIGS. 5A-5C are radar sweeps 46 at the following three different respective times: point of interest selection, calculation of point of interest range and bearing 45, and upon approaching the point of interest (as though it were a destination). All three radar sweeps 46 are depicted in head-up orientation as is conventional. FIGS. 6A-6C are corresponding charts 48 at the same three different respective times. Land masses 92 and 94 find correspondence on all six Figures. All three charts 48 are depicted in north-up orientation as is conventional. Dashed lines 90 represent current heading 40 of radar antenna 32.

Scale 96 on radar sweep 46 represents relative bearing, i.e. the number of degrees between heading to point of interest direction. On chart 48, scale 97 represents compass bearing, i.e. what the compass reads in the direction of the point of interest. Scale 98 represents latitude and scale 99 represents longitude. Dotted line 91 represents bearing from radar antenna 32 to the point of interest. In FIGS. 5A-5C, which are oriented head-up, bearing line 91 is relative bearing; and, in FIGS. 6A-6C, which are oriented north-up, bearing line 91 is compass bearing.

Referring to FIGS. 6A and 6B, point of interest indicator 50 is immediately displayed upon selection in FIG. 6A since its location on chart display 48 does not change. As illustrated, point of interest compass bearing appears to be about 90°. Reasons why current heading 90 does not match point of interest bearing 91 include wind, tide, current, obstacle avoidance, circuitous routing and the like.

Referring to FIGS. 5A and 5B, point of interest indicator 50 does not appear on radar sweep 46 immediately upon selection in FIG. 5A, but does appear after point of interest range and bearing 45 are calculated (FIG. 5B) because the position of the point of interest changes on radar sweep 46 as radar antenna 32 moves. As illustrated, point of interest relative bearing appears to be about 20°.

Figure 7:
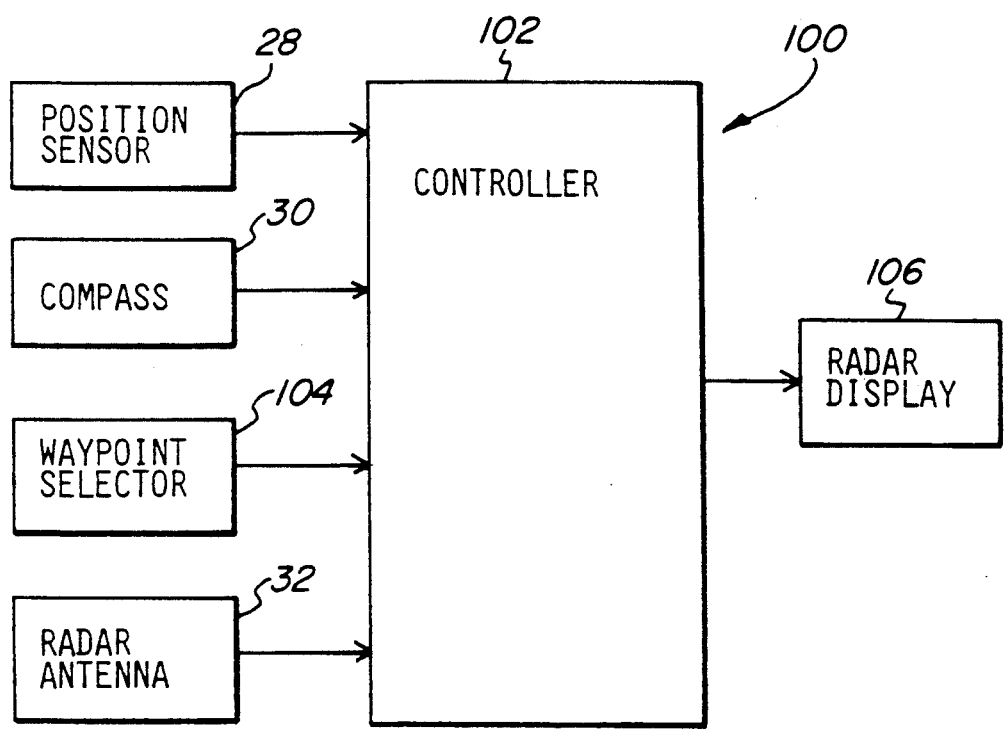
FIG. 7 is a block diagram of a prior art waypoint radar to the visual navigation aid of FIG. 1.
Figure 8:
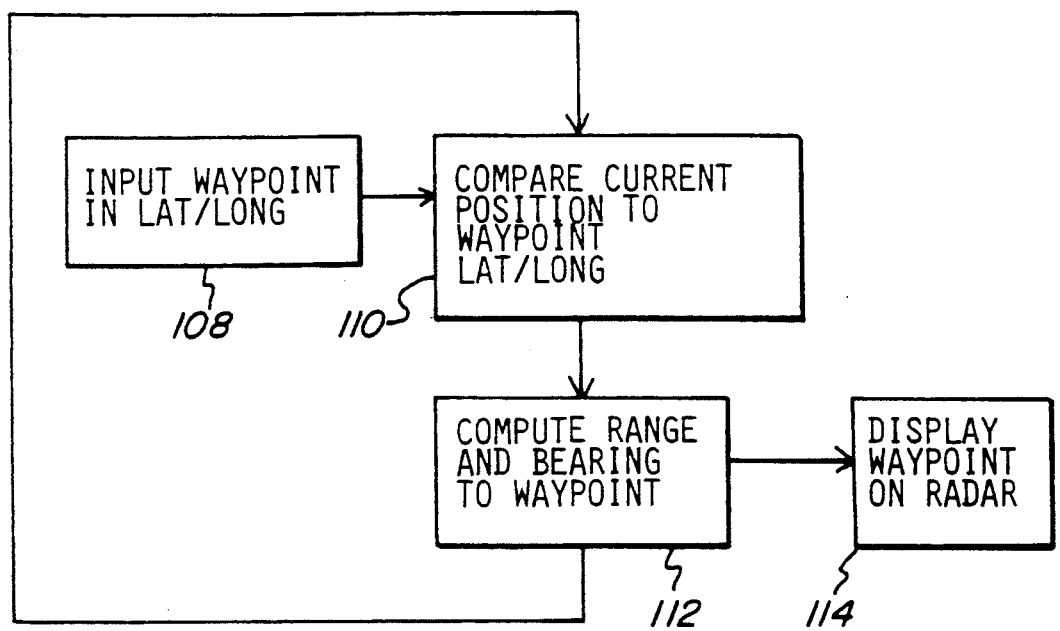
FIG. 8 is a flow diagram depicting operation of the prior art waypoint radar of FIG. 7.

FIGS. 7 and 8 are respectively block and flow diagrams which generally depict a prior art waypoint radar system 100. Referring first to FIG. 7, waypoint radar system 100, generally comprises a controller 102 which receives input from a position sensor 28, a compass 30, a radar antenna 32, and a waypoint selector 104. Prior art controller 102 receives no map/chart data input 34. The waypoint and radar data 42 are output from controller 102 on a radar display 106. Controller 102 includes no display controller 38 and no capability to display charts or waypoints thereon.

Turning now to FIG. 8, waypoint radar 100 operates from inputting at 108 a waypoint location in latitude and longitude. The waypoint is not visually selected on radar display 106. At 110, the waypoint location is compared to the current position 40 of the radar antenna; and, at 112, controller 102 computes range and bearing from radar antenna 32 to the waypoint location. A waypoint indicator (not shown in any Figure) is then displayed at 114 on the radar at the computed waypoint location. Comparing step 110 and computing step 112 are repeated to update the relative position of the waypoint.

Figure 9:
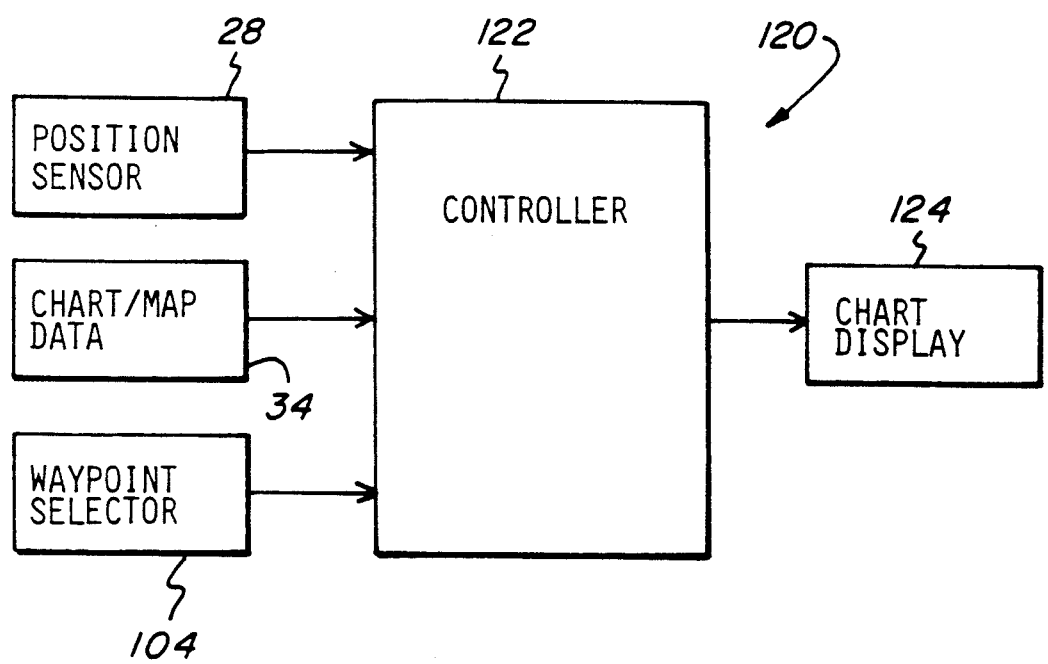
FIG. 9 is a block diagram of a prior art waypoint chart plotter to the visual navigation aid of FIG. 1.
Figure 10:
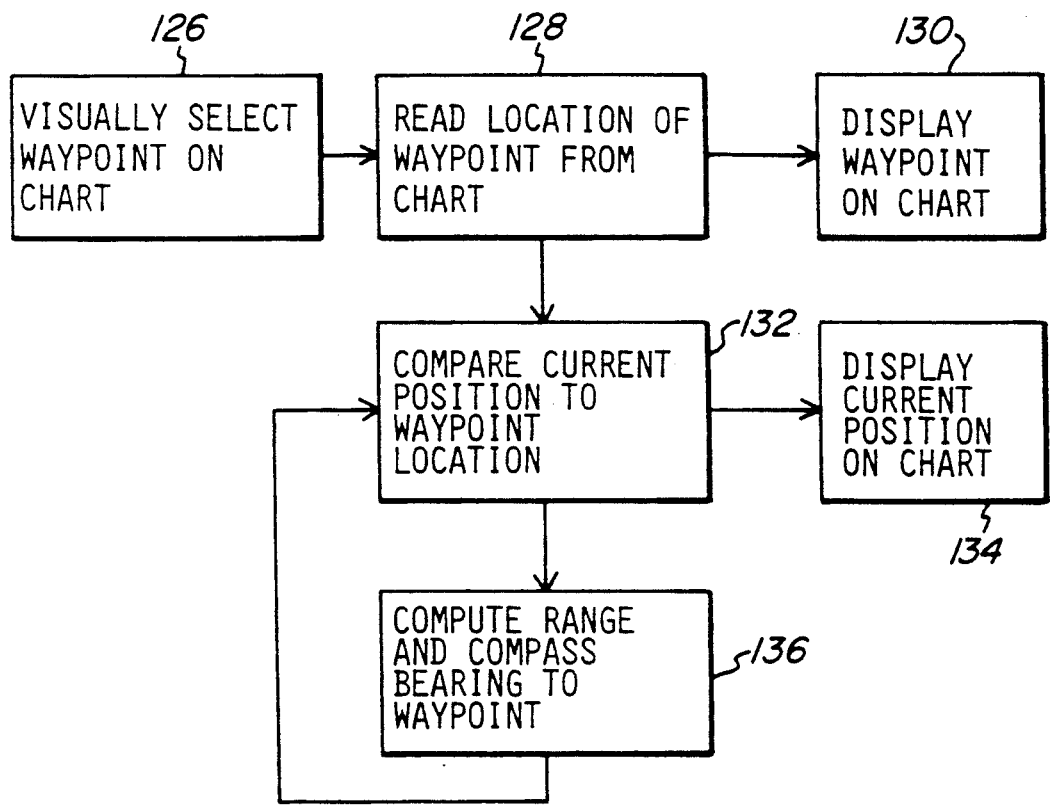
FIG. 10 is a flow diagram depicting operation of the prior art waypoint chart plotter of FIG. 9.

FIGS. 9 and 10 are respectively block and flow diagrams which generally depict a prior art waypoint chart plotter 120. Referring first to FIG. 9, waypoint chart plotters 120 generally comprise a controller 122 which receives input from a position sensor 28, chart/map data 34, and a waypoint selector 104. Prior art controller 122 receives no input from compass 30, or radar antenna 32. The waypoint and chart data 34 are output from controller 122 on a chart display 124. Controller 122 includes no display controller 38 and no capability to display radar sweeps or waypoints thereon.

Turning now to FIG. 10, waypoint chart plotter 120 operates from visually inputting at 126 a waypoint on chart display 124. The latitude and longitude location of the waypoint is read at 128 from the chart and a waypoint indicator (not shown in any Figure) is depicted at 130 on chart display 124 in the selection location. The waypoint location is then compared at 132 to the current position of position sensor 28. Since waypoint chart plotter 120 includes no radar antenna, the waypoint location can not be compared to the antenna position. The current position of position sensor 28 is depicted at 134 on chart display 124. Then at 136, controller 122 computes range and compass bearing from position sensor 28 to the waypoint. Since controller 122 receives no compass input, relative bearing can not be computed. Comparing step 132 and computing step 136 are repeated to update the range and compass bearing to the waypoint.

Although the invention has been described with reference to a particular arrangement of parts, features and the like, these are not intended to exhaust all possible arrangements or features, and indeed many other modifications and variations will be ascertainable to those of skill in the art.

We claim:

1. A visual navigation aid comprising
a radar antenna;
means for storing map data;
a compass;
means for sensing the position of said radar antenna;
a display;
means for inputting at least one point of interest; and
a controller, said controller responsive to said radar antenna to depict a radar sweep on said display, said controller responsive to said map data storage means to depict a map on said display;
said controller responsive to said compass, said position sensing means and said point of interest input means for controlling said display to depict the point of interest in its proper position on both the map and the radar sweep,
whereby radar targets, map features and the point of interest may be correlated.

2. The visual navigation aid of claim 1 wherein said controller comprises a toggle switch for depicting the point of interest alternately on the map display and the sweep display.

3. The visual navigation aid of claim 1 wherein said controller comprises means for substantially matching a scale of the map and a range of the radar sweep.

4. The visual navigation aid of claim 1 wherein said controller comprises means for depicting the radar sweep on said display in a north-up orientation.

5. The visual navigation aid of claim 1 wherein said controller comprises means for depicting the map on said display in a head-up orientation.

6. A method for displaying a point of interest on a radar sweep from a radar antenna comprising the steps of:
selecting the point of interest on a chart;
determining the location of the point of interest;
receiving a current geographical position of the radar antenna;
comparing the current position of the radar antenna to the point of interest location;
computing range and bearing from the radar antenna to the point of interest location; and
displaying the point of interest on the radar sweep at the point of interest location.

7. The method of claim 6 wherein computing comprises computing range and compass bearing from the radar antenna to the point of interest location.

8. The method of claim 7 including, before displaying, the steps of receiving a current heading of the radar antenna, and computing range and relative bearing to the point of interest location.

9. The method of claim 6 including, after displaying, the step of repeating the receiving, comparing, computing and displaying steps for a new current position.

10. A method for displaying a point of interest on a chart comprising the steps of:
visually selecting a point of interest on a radar sweep from a radar antenna;
determining initial range and initial bearing from the radar antenna to the point of interest;
receiving an initial geographical position of the radar antenna;
calculating a location of the point of interest; and
displaying the point of interest on the chart at the point of interest location.

11. The method of claim 10 wherein determining comprises determining initial relative bearing from the radar antenna to the point of interest.

12. The method of claim 10 including, before calculating, the steps of receiving an initial heading of the radar antenna, and computing an initial compass bearing from the radar antenna to the point of interest.

13. The method of claim 10 including the steps of:
receiving a current position of the radar antenna;

comparing the current position of the radar antenna to the point of interest location; and computing range and bearing from the radar antenna to the point of interest location.

14. The method of claim 13 where computing comprises computing range and compass bearing from the radar antenna to the point of interest location.

15. The method of claim 14 including, after computing, the steps of receiving a current heading of the radar antenna, and computing range and relative bearing from the radar antenna to the point of interest location.

16. The method of claim 13 including, after computing, the step of displaying the point of interest on the radar sweep at the point of interest location.

17. The method of claim 16 including the step of toggling between displaying the point of interest on the chart and displaying the point of interest on the radar sweep.

18. The method of claim 13 including the step of substantially matching a scale of the chart and a range of the radar sweep.

19. The method of claim 13 including the step of displaying the radar sweep in a north-up orientation.

20. The method of claim 10 including, after computing, the step of repeating the receiving, comparing, and computing steps for a new current position.

21. A visual navigation aid comprising:
a radar antenna;
means for storing map data;
a compass;
means for sensing the geographic position of said radar antenna;
a display; and
a controller responsive to said radar antenna to depict a radar sweep on said display, and responsive to said map data storage means to depict a map on said display;
said controller responsive to said compass and to said geographic position sensing means for controlling said display to depict the radar targets and chart features in geographic correlation.

22. The visual navigation method of claim 21 where said controller comprises a toggle switch for alternately depicting the map display and the chart display.

* * * * *